US011892562B2

(12) United States Patent
Wang et al.

(10) Patent No.: US 11,892,562 B2
(45) Date of Patent: Feb. 6, 2024

(54) IMPULSE-LIKE GESTURE RECOGNITION METHOD, AND IMPULSE-LIKE GESTURE RECOGNITION SYSTEM

(71) Applicant: KaiKuTek Inc., Taipei (TW)

(72) Inventors: Mike Chun-Hung Wang, Taipei (TW); Chun-Hsuan Kuo, San Diego, CA (US); Wen-jyi Hwang, Taipei (TW); Guan-Sian Wu, Taichung (TW); Chieh Wu, Hsinchu (TW); Wen-Yen Chou, New Taipei (TW); Yu-Feng Wu, Zhubei (TW); Fang Li, New Taipei (TW); Wen-Yen Chang, New Taipei (TW)

(73) Assignee: KaiKuTek Inc., Taipei (TW)

( * ) Notice: Subject to any disclaimer, the term of this patent is extended or adjusted under 35 U.S.C. 154(b) by 674 days.

(21) Appl. No.: 17/084,986

(22) Filed: Oct. 30, 2020

(65) Prior Publication Data

US 2022/0137184 A1    May 5, 2022

(51) Int. Cl.
*G01S 7/41*     (2006.01)
*G06N 20/00*   (2019.01)
*G01S 13/00*   (2006.01)

(52) U.S. Cl.
CPC .............. *G01S 7/415* (2013.01); *G06N 20/00* (2019.01); *G01S 7/417* (2013.01)

(58) Field of Classification Search
None
See application file for complete search history.

(56) References Cited

U.S. PATENT DOCUMENTS 8,166,421 B2 * 4/2012 Magal ............... G06F 3/017
382/218
9,275,347 B1 * 3/2016 Harada .............. G06N 3/08
(Continued)

FOREIGN PATENT DOCUMENTS

CN      108664122 A  * 10/2018  ............. G06N 3/08
EP       2400371 A2  * 12/2011  ........... G06F 40/177
(Continued)

OTHER PUBLICATIONS

Paul E. Black, "Manhattan distance", in Dictionary of Algorithms and Data Structures [online], Paul E. Black, ed. Feb. 11, 2019. (accessed Jul. 24, 2023) Available from: https://www.nist.gov/dads/HTML/manhattanDistance.html (Year: 2019).*
(Continued)

*Primary Examiner* — Bernarr E Gregory
(74) *Attorney, Agent, or Firm* — Best & Flanagan LLP

(57) ABSTRACT

A performing device of an impulse-like gesture recognition system executes an impulse-like gesture recognition method. A performing procedure of the impulse-like gesture recognition method includes steps of: receiving a sensing signal from a sensing unit; determining a prediction with at least one impulse-like label according to the sensing frames by a deep learning-based model; and classifying at least one gesture event according to the prediction. The gesture event is classified to determine the motion of the user. Since the at least one impulse-like label is used to label at least one detection score of the deep learning-based model, the detection score is non-decreasing, reaction time of the at least one gesture event for an incoming gesture is fast, rapid consecutive gestures are easily decomposed, and an expensive post-processing is not needed.

9 Claims, 5 Drawing Sheets

(56) References Cited

U.S. PATENT DOCUMENTS

| | | | |
|---|---|---|---|
| 10,890,653 B2 | 1/2021 | Giusti et al. | |
| 2008/0170776 A1* | 7/2008 | Albertson | G06F 21/36 382/154 |
| 2009/0100383 A1* | 4/2009 | Sunday | G06F 3/04883 715/863 |
| 2010/0199231 A1* | 8/2010 | Markovic | G06F 3/017 715/863 |
| 2015/0277569 A1* | 10/2015 | Sprenger | G06F 3/017 345/156 |
| 2017/0206405 A1* | 7/2017 | Molchanov | G06N 3/044 |
| 2019/0042490 A1* | 2/2019 | Schmisseur | G06N 20/00 |
| 2019/0258935 A1* | 8/2019 | Umeda | G06N 3/084 |
| 2019/0279085 A1* | 9/2019 | Umeda | G06N 3/08 |
| 2021/0342008 A1* | 11/2021 | Sachidanandam | G01S 7/415 |

FOREIGN PATENT DOCUMENTS

| | | | | |
|---|---|---|---|---|
| EP | 2711805 A1 * | 3/2014 | | G06F 3/018 |
| EP | 3188086 A1 * | 7/2017 | | G06N 3/08 |
| TW | 202009684 A | 3/2020 | | |
| WO | WO2020/176105 A1 * | 9/2020 | | G01S 7/417 |

OTHER PUBLICATIONS

Souvik Hazra and Avik Santra, S. Hazra and A. Santra, Short Range Radar Based Gesture Recognition System Using 3D CNN With Triplet Loss, IEEE Access, Aug. 30, 2019, pp. 125623 to 125633, vol. 7, 2019, IEEE.

Sruthy Skaria, Akram Al-Hourani and Robin J. Evans, Deep Learning Methods for Hand Gesture Recognition Using Ultra Wideband Radar, IEEE Access, Nov. 10, 2020, pp. 203580 to 203590, vol. 8, 2020, IEEE.

* cited by examiner

IMPULSE-LIKE GESTURE RECOGNITION METHOD, AND IMPULSE-LIKE GESTURE RECOGNITION SYSTEM

BACKGROUND OF THE INVENTION

1. Field of the Invention

The present invention relates to a recognition method and a recognition system, and more particularly to an impulse-like gesture recognition method and an impulse-like gesture recognition system.

2. Description of the Related Art

Recognition systems generally receive sensing signals from a sensor to recognize a motion of a user. For example, the recognition system receives sensing signals from the sensor, processes the sensing signals using the recognition system, and utilizes the recognition system to implement a recognition method to determine whether a user being observed by the sensor is using portions of his or her body to make particular actions or form particular shapes or gestures. The recognition system classifies the motion of the user, and associates the motion of the user with executable commands or instructions.

Recently, online gesture recognition is getting more and more popular in the research community due to various application possibilities in human-machine interactions. However, the online gesture recognition is challenging mainly for the following reasons:
1. the detection score violates the monotonicity;
2. the reaction time is long;
3. the rapid consecutive gestures cannot be easily decomposed; and
4. the post-processing using hand-crafted mechanism needs to be applied.

Namely, when the motion of the user is a complex motion, a gesture recognition process of the recognition system is time consuming. The recognition system may not perform the online gesture recognition due to the complex motion of the user.

Therefore, the recognition system needs to be further improved.

SUMMARY OF THE INVENTION

An objective of the present invention is to provide an impulse-like gesture recognition method and an impulse-like gesture recognition system. The present invention may present an online gesture recognition, and achieve the following capabilities:
1. the detection score is non-decreasing;
2. fast reaction time for an incoming gesture is achieved;
3. the rapid consecutive gestures are easily decomposed; and
4. the expensive post-processing is not needed.

The impulse-like gesture recognition method includes a performing procedure, and the performing procedure includes steps of:
receiving a sensing signal from a sensing unit; wherein the sensing signal comprises a plurality of sensing frames;
determining a prediction with at least one impulse-like label according to the sensing frames by a deep learning-based model; wherein the at least one impulse-like label labels at least one detection score of the deep learning-based model; and
classifying at least one gesture event according to the prediction.

Further, the impulse-like gesture recognition system includes a performing device. The performing device includes a sensing unit, a memory unit, and a processing unit.

The sensing unit senses a sensing signal, and the sensing signal comprises a plurality of sensing frames. The memory unit stores a deep learning-based model.

The processing unit is electrically connected to the sensing unit and the memory unit. The processing unit executes a performing procedure.

The processing unit receives the sensing signal from the sensing unit, determines a prediction with at least one impulse-like label according to the sensing frames by the deep learning-based model stored in the memory unit, and classifies at least one gesture event according to the prediction. The at least one impulse-like label labels at least one detection score of the deep learning-based model.

Since the impulse-like gesture recognition system uses the at least one impulse-like label to label the at least one detection score of the deep learning-based model, the detection score is non-decreasing.

When the at least one impulse-like label labels at least one detection score, the least one gesture event can be classified immediately. Therefore, reaction time of the at least one gesture event for an incoming gesture is short.

Further, rapid consecutive gesture events can be classified by individual impulse-like labels. Namely, the rapid consecutive gestures are easily decomposed, and an expensive post-processing is not needed.

DETAILED DESCRIPTION OF THE INVENTION

Figure 1:
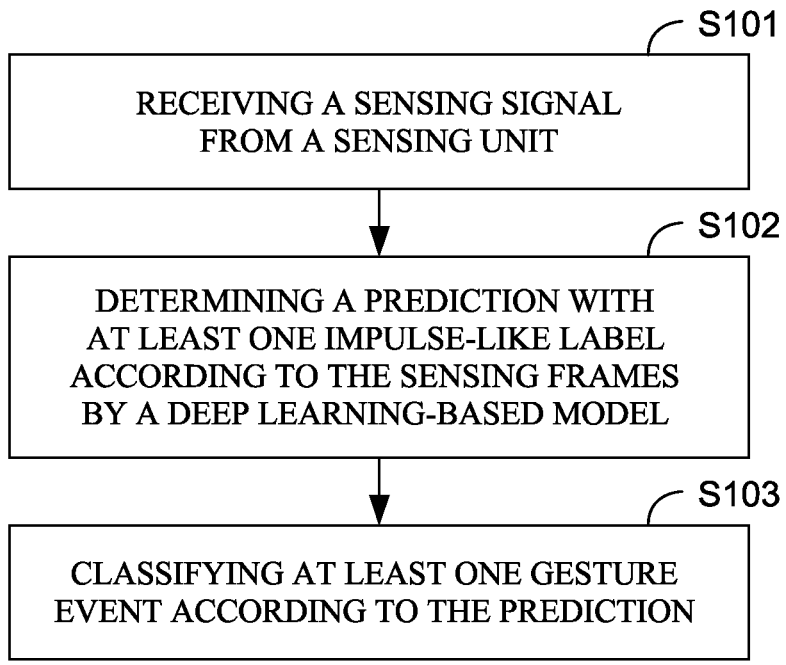
FIG. 1 is a flowchart of a performing procedure of an impulse-like gesture recognition method of the present invention.
Figure 2:
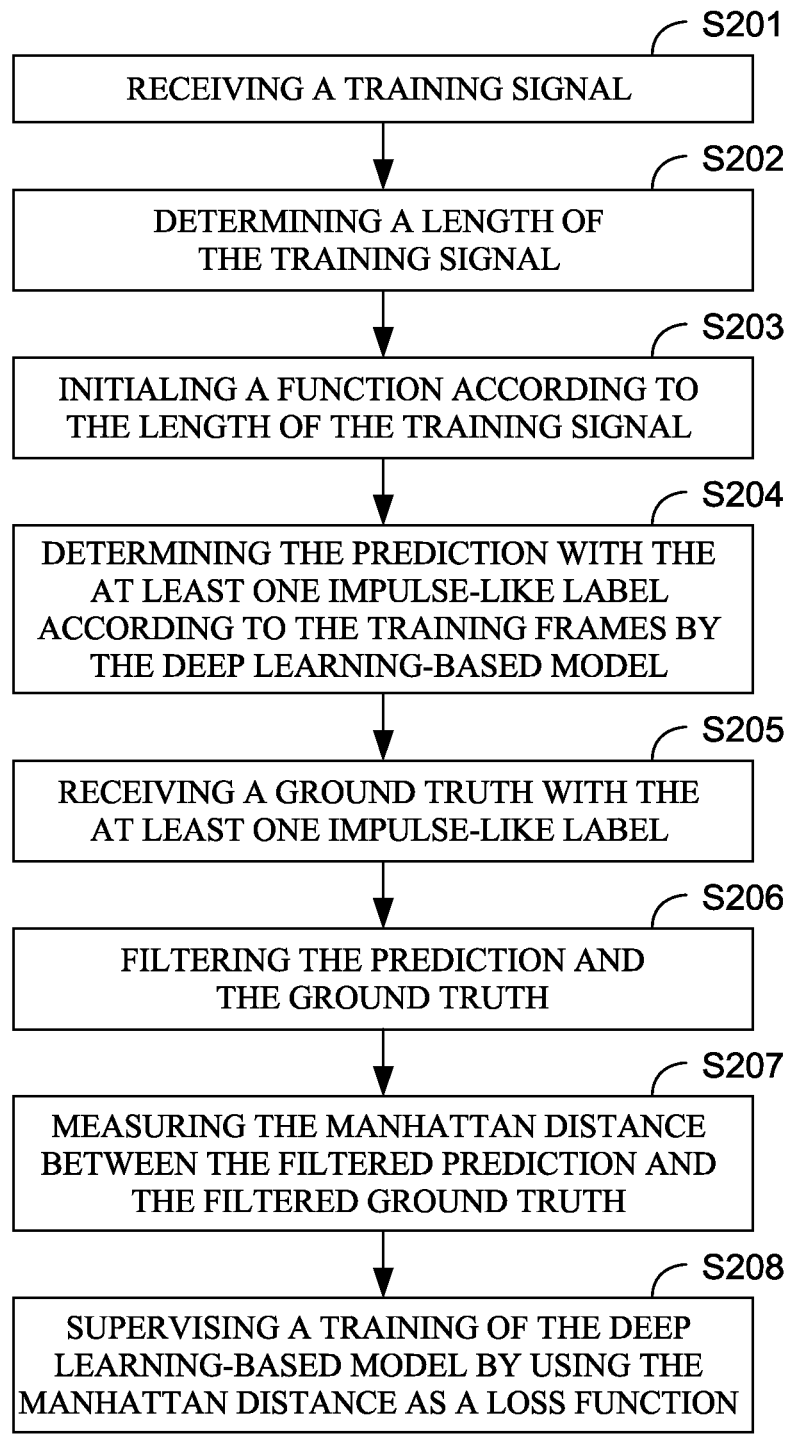
FIG. 2 is a flowchart of a training procedure of the impulse-like gesture recognition method of the present invention.

With reference to FIGS. 1 and 2, the present invention relates to an impulse-like gesture recognition method and an impulse-like gesture recognition system.

The impulse-like gesture recognition method includes a performing procedure, and the performing procedure includes steps of:
receiving a sensing signal from a sensing unit (S101); wherein the sensing signal comprises a plurality of sensing frames;

determining a prediction with at least one impulse-like label according to the sensing frames by a deep learning-based model (S102); wherein the at least one impulse-like label labels at least one detection score of the deep learning-based model; and classifying at least one gesture event according to the prediction (S103).

Since the impulse-like gesture recognition system uses the at least one impulse-like label to label the at least one detection score of the deep learning-based model, the detection score is non-decreasing.

When the at least one impulse-like label labels at least one detection score, the least one gesture can be classified immediately. Therefore, reaction time of the at least one gesture event for an incoming gesture is short.

Further, rapid consecutive gesture events can be classified by individual impulse-like labels. Namely, the rapid consecutive gestures are easily decomposed, and an expensive post-processing is not needed.

Moreover, the impulse-like gesture recognition method further includes a training procedure for training the deep learning-based model, and the training procedure includes steps of:

receiving a training signal (S201); wherein the training signal comprises a plurality of training frames;

determining a length of the training signal (S202);

initializing a function according to the length of the training signal (S203);

determining the prediction with the at least one impulse-like label according to the training frames by the deep learning-based model (S204);

receiving a ground truth with the at least one impulse-like label (S205);

filtering the prediction and the ground truth (S206); wherein the prediction and the ground truth are filtered by the initialized function;

measuring the Manhattan distance between the filtered prediction and the filtered ground truth (S207); and supervising a training of the deep learning-based model by using the Manhattan distance as a loss function (S208).

In an embodiment, the length of the training signal is determined according to an amount of the training frames, and the function is the Gaussian kernel.

Moreover, the Gaussian kernel is:

$$\Phi_{1D} = G_{1D}(\mu; \sigma) = \frac{1}{\sqrt{2\pi\sigma^2}} e^{-\frac{u^2}{2\sigma^2}};$$

and the parameter σ determines a width of the Gaussian kernel.

In statistics, a Gaussian probability density function is considered as the standard deviation.

Figure 3:
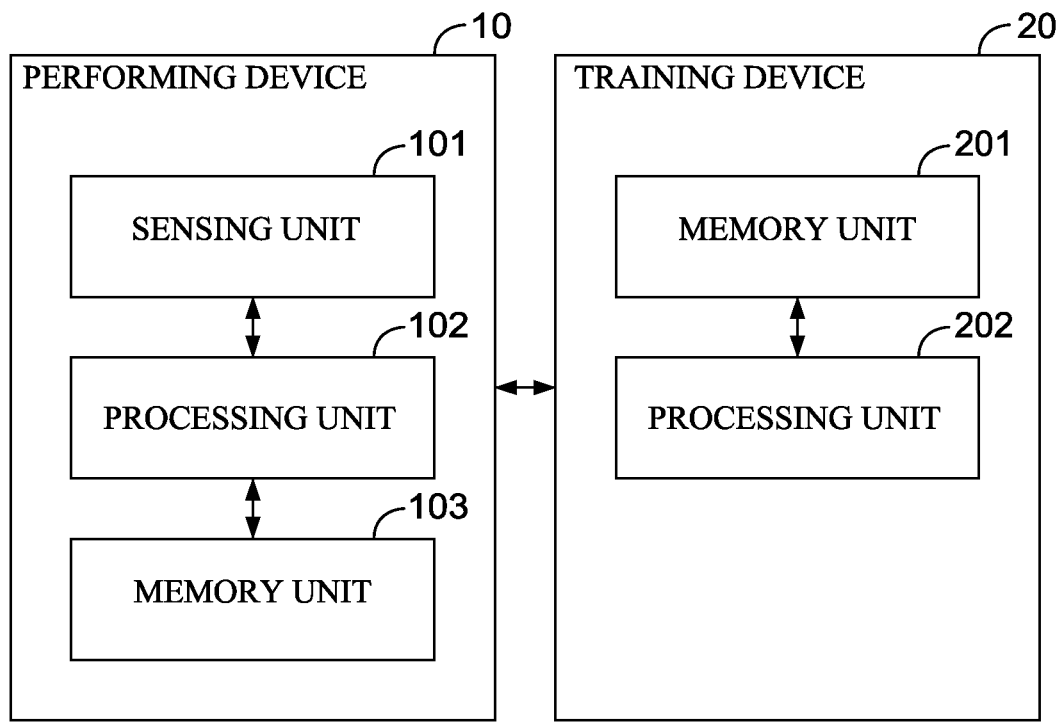
FIG. 3 is a block diagram of an impulse-like gesture recognition system of present invention.

With reference to FIG. 3, the impulse-like gesture recognition system includes a performing device 10 training device 20.

The performing device 10 includes a sensing unit 101, a memory unit 102, and a processing unit 103.

The sensing unit 101 senses the sensing signal, and the sensing signal comprises a plurality of sensing frames. The memory unit 102 stores the deep learning-based model.

The processing unit 103 is electrically connected to the sensing unit 101 and the memory unit 102. The processing unit 103 receives the sensing signal from the sensing unit 101, determines a prediction with at least one impulse-like label according to the sensing frames by the deep learning-based model stored in the memory unit 102, and classifies at least one gesture event according to the prediction.

In the embodiment, the at least one impulse-like label labels at least one detection score of the deep learning-based model.

Further, the training device 20 includes a memory unit 201 and a processing unit 202. The memory unit 201 stores the deep learning-based model, a training signal, and a around truth. The training signal comprises a plurality of training frames.

The processing unit 202 is electrically connected to the memory unit 201. The processing unit 20 receives the training signal, determines the prediction with the at least one impulse-like label according to the training frames by the deep learning-based model, receives the ground truth with the at least one impulse-like label, filters the prediction and the around truth, measures the Manhattan distance between the filtered prediction and the filtered ground truth, and supervises a training of the deep learning-based model by using the Manhattan distance as a loss function.

In the embodiment, the deep learning-based model stored in the memory unit 102 of the performing device 10 is loaded from the memory unit 201 of the training device 20.

Moreover, the processing unit of the training device further determines a length of the training signal and initializes a function according to the length of the training signal.

In an embodiment, the length of the training signal is determined according to an amount of the training frames, and the length of the training signal is determined according to an amount of the training frames, and the function is the Gaussian kernel.

Figure 4A:
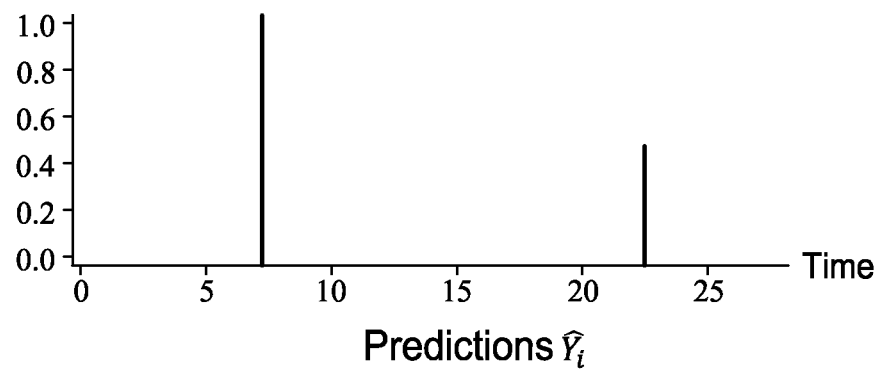
FIG. 4A is a schematic diagram of a prediction with at least one impulse-like label.
Figure 4B:
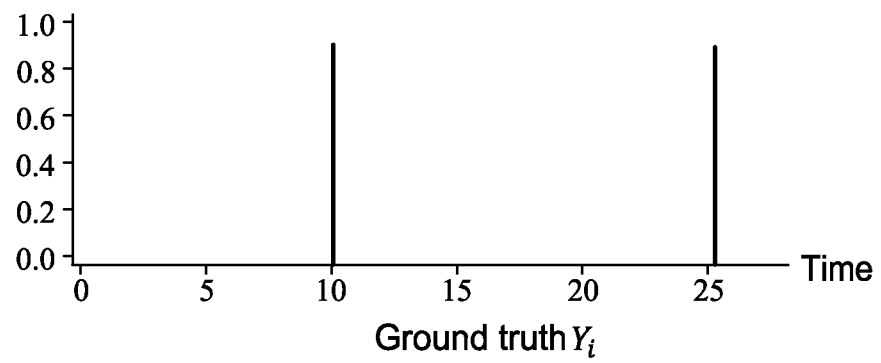
FIG. 4B is a schematic diagram of a ground truth with the at least one impulse-like label.

For example, with reference to FIGS. 4A and 4B, when the deep learning-based model receives the sensing signal, the deep learning-based model can determine the prediction $\hat{Y}_i$ with the at least one impulse-like label shown in FIG. 4A. The ground truth $Y_i$ with the at least one impulse-like label stored in the memory 201 of the training device 20 is shown in FIG. 4B.

Figure 5A:
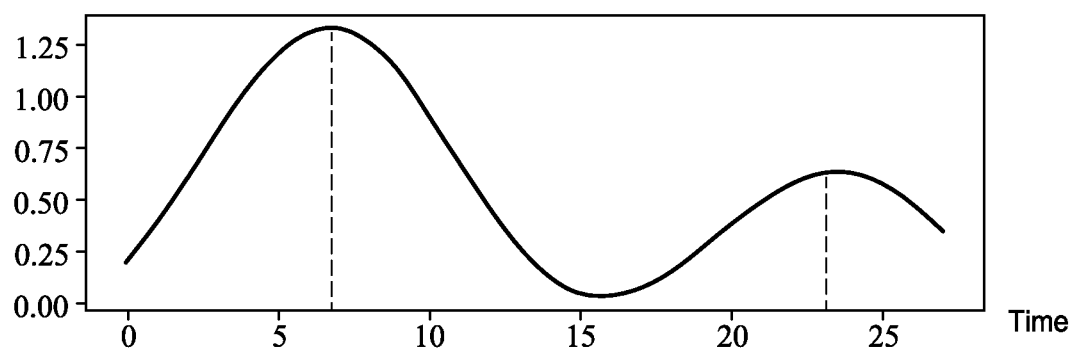
FIG. 5A is a schematic diagram of the filtered prediction.
Figure 5B:
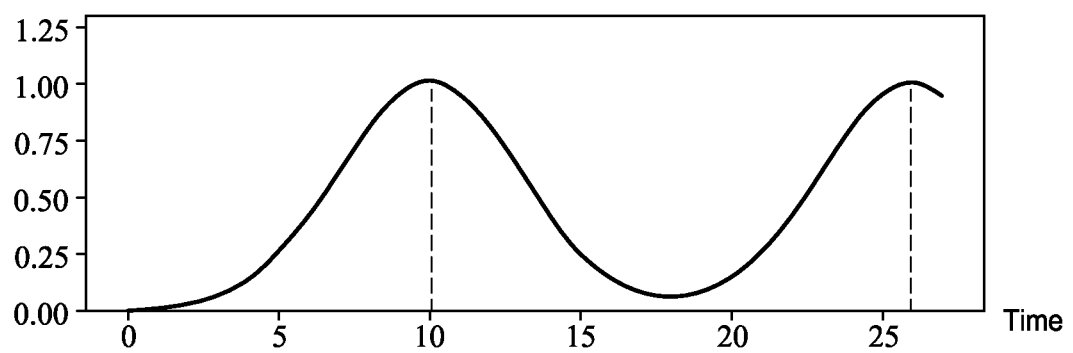
FIG. 5B is a schematic diagram of the filtered ground truth.

Further, with reference to FIGS. 5A and 5B, when the prediction with the at least one impulse-like label is filtered by the Gaussian kernel, the filtered prediction is shown in FIG. 5A. When the ground truth with the at least one impulse-like label is filtered by the Gaussian kernel, the filtered ground truth is shown in FIG. 5B.

When the prediction and the ground truth are filtered by the Gaussian kernel, the processing unit 202 of the training device 20 can measure the Manhattan distance between the filtered prediction and the filtered ground truth, and further train the deep learning-based model by using the Manhattan distance as the loss function.

In the embodiment of the present invention, the sensing unit is a Doppler radar, the performing device is a smart phone with the Doppler radar, and the deep learning-based model is a Convolution Neural Network (CNN) or a Recurrent Neural Network (RNN).

In the embodiment of the present invention, the impulse-like gesture recognition method is executed by the impulse-like gesture recognition system. For example, the performing device 10 of the impulse-like gesture recognition system executes the performing procedure of the impulse-like gesture recognition method, and the training device 20 of the impulse-like gesture recognition system executes the training procedure of the impulse-like gesture recognition method.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A gesture recognition method comprising:
   a performing procedure, wherein the performing procedure includes steps of:
     receiving a sensing signal from a Doppler radar; wherein the sensing signal comprises a plurality of sensing frames;
     determining a prediction with at least one label according to the sensing frames by a deep learning-based model; wherein the at least one label labels at least one detection score of the deep learning-based model; and
     classifying at least one gesture event according to the prediction.

2. The gesture recognition method as claimed in claim 1, further comprising:
   a training procedure for training the deep learning-based model, wherein the training procedure comprises steps of:
     receiving a training signal; wherein the training signal comprises a plurality of training frames;
     determining the prediction with the at least one label according to the training frames by the deep learning-based model;
     receiving a ground truth with the at least one label;
     filtering the prediction and the ground truth;
     measuring the Manhattan distance between the filtered prediction and the filtered ground truth; and
     supervising a training of the deep learning-based model by using the Manhattan distance as a loss function.

3. The gesture recognition method as claimed in claim 2, wherein the training procedure further comprises steps of:
   determining a length of the training signal; and
   initializing a function according to the length of the training signal;
   wherein the prediction and the ground truth are filtered by the initialized function.

4. The gesture recognition method as claimed in claim 3, wherein the length of the training signal is determined according to an amount of the training frames.

5. The gesture recognition method as claimed in claim 3, wherein the function is the Gaussian kernel.

6. A gesture recognition system comprising:
   a performing device; wherein the performing device comprises:
     a Doppler radar, wherein the Doppler radar senses a sensing signal and the sensing signal comprises a plurality of sensing frames;
     a first memory unit, wherein the first memory unit stores a deep learning-based model; and
     a first processing unit electrically connected to the Doppler radar and the first memory unit, wherein the first processing unit receives the sensing signal from the Doppler radar, determines a prediction with at least one label according to the sensing frames by the deep learning-based model stored in the first memory unit, and classifies at least one gesture event according to the prediction;
   wherein the at least one label labels at least one detection score of the deep learning-based model; and
   a training device, wherein the training device comprises:
     a second memory unit, wherein the second memory unit stores the deep learning-based model, a training signal, and a ground truth; wherein the training signal comprises a plurality of training frames; and
     a second processing unit, electrically connected to the second memory unit of the training device; wherein the second processing unit receives the training signal, determines the prediction with the at least one label according to the training frames by the deep learning-based model, receives the ground truth with the at least one label, filters the prediction and the ground truth, measures the Manhattan distance between the filtered prediction and the filtered ground truth, and supervises a training of the deep learning-based model by using the Manhattan distance as a loss function;
   wherein the deep learning-based model stored in the first memory unit is loaded from the second memory unit.

7. The gesture recognition system as claimed in claim 6, wherein the second processing unit further determines a length of the training signal and initializes a function according to the length of the training signal; wherein the prediction and the ground truth are filtered by the initialized function.

8. The gesture recognition system as claimed in claim 7, wherein the length of the training signal is determined according to an amount of the training frames.

9. The gesture recognition system as claimed in claim 7, wherein the function is the Gaussian kernel.

* * * * *